US010568159B2

(12) United States Patent
Bangalore Satyanarayana et al.

(10) Patent No.: US 10,568,159 B2
(45) Date of Patent: Feb. 18, 2020

(54) SPLIT BEARER ENHANCEMENT FOR MULTI-CONNECTIVITY

(71) Applicant: NOKIA SOLUTIONS AND NETWORKS OY, Espoo (FI)

(72) Inventors: Sheshachalam Bangalore Satyanarayana, Bangalore (IN); Tsunehiko Chiba, Saitama (JP); Suresh Kalyanasundaram, Bangalore (IN); Masatoshi Nakamata, Kawasaki (JP); Claudio Rosa, Randers (DK); Takeshi Tanaka, Kanagawa (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/738,053

(22) PCT Filed: Jun. 20, 2016

(86) PCT No.: PCT/EP2016/064168
§ 371 (c)(1),
(2) Date: Dec. 19, 2017

(87) PCT Pub. No.: WO2017/005478
PCT Pub. Date: Jan. 12, 2017

(65) Prior Publication Data
US 2018/0310353 A1    Oct. 25, 2018

(30) Foreign Application Priority Data

Jul. 3, 2015    (IN) .......................... 2019/DEL/2015

(51) Int. Cl.
*H04W 76/15*    (2018.01)
*H04W 92/04*    (2009.01)
(Continued)

(52) U.S. Cl.
CPC .......... *H04W 76/15* (2018.02); *H04W 84/045* (2013.01); *H04W 92/045* (2013.01); *H04W 92/20* (2013.01)

(58) Field of Classification Search
CPC ... H04W 76/15; H04W 92/20; H04W 84/045; H04W 76/27; H04W 16/32; H04W 88/16;
(Continued)

(56) References Cited

U.S. PATENT DOCUMENTS 9,838,935 B2 * 12/2017 Wang ..................... H04B 7/155
10,206,147 B2 * 2/2019 Horn ................. H04W 36/0027
(Continued)

FOREIGN PATENT DOCUMENTS

WO    2015032565 A1    3/2015

OTHER PUBLICATIONS

3GPP TSG-RAN WG2 Meeting #81bis; R2-131185; "Considerations on Network Architecture for Dual Connectivity"; Chicago, IL, USA, Apr. 15-19, 2013; 4 pages.
(Continued)

*Primary Examiner* — Liton Miah
(74) *Attorney, Agent, or Firm* — Brake Hughes Bellermann LLP

(57) ABSTRACT

There is provided a communicating, at a first network access point, with a core network entity using a user plane protocol, said communicating comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein
(Continued)

the first network access point does not communicate with the core network using a control plane protocol associated with the first bearer.

18 Claims, 10 Drawing Sheets

(51) Int. Cl.
*H04W 92/20* (2009.01)
*H04W 84/04* (2009.01)

(58) Field of Classification Search
CPC ............... H04W 92/02; H04W 28/085; H04W 36/0027; H04W 76/10; H04W 88/08; H04W 92/045; H04W 36/0022; H04W 80/04; H04W 28/0252
See application file for complete search history.

(56) References Cited

U.S. PATENT DOCUMENTS

| | | | |
|---|---|---|---|
| 10,383,009 B2* | 8/2019 | Chiba | ............... H04W 36/0027 |
| 10,383,066 B2* | 8/2019 | Futaki | ............... H04W 72/1284 |
| 2014/0269632 A1 | 9/2014 | Blankenship et al. | |
| 2014/0342748 A1 | 11/2014 | Zou | |
| 2016/0135220 A1* | 5/2016 | Jha | ..................... H04W 74/002 455/434 |
| 2016/0242080 A1* | 8/2016 | Vikberg | ............ H04W 36/0027 |
| 2017/0188253 A1* | 6/2017 | Bergstrom | ...... H04W 36/00835 |
| 2018/0279176 A1* | 9/2018 | Legg | ....................... H04L 47/34 |

OTHER PUBLICATIONS

3GPP TSG-RAN WG2 Meeting #81 bis; R2-131174; "Protocol architecture for dual connectivity"; Chicago, IL, USA, Apr. 15-19, 2013; 8 pages.

3GPP TSG-RAN WG2 Meeting #82; R2-131907; "Discussion on different backhaul alternatives for small cell enhancements"; Fukuoka, Japan, May 20-27, 2013; 5 pages.

3GPP TSG-RAN WG2 Meeting #83; R2-132413; "Discussion on different architecture alternatives for small cell enhancements"; Barcelona, Spain, Aug. 19-23, 2013; 4 pages.

3GPP TR 36.842 V12.0.0; "3rd Generation Partnership Project; Technical Specification Group Radio Access Network; Study on Small Cell enhancements for E-UTRA and E-UTRAN; Higher layer aspects (Release 12)", Dec. 2013; 71 pages.

International Search Report and Written Opinion for International Application No. PCT/EP2016/064168, dated Sep. 12, 2016; 11 pages.

Office Action for European Application No. 16731121.6, dated Jun. 5, 2019, 5 pages.

3GPP TSG-RAN WG3 #85bis; R3-142396; "On Data Forwarding for Split Bearer"; Oct. 6-10, 2014, Shanghai, China; 4 pages.

3GPP TSG-RAN3 #86; R3-142815; "Text Proposal to 36.300 for DL Data Forwarding for Split Bearer"; Nov. 17-21, 2014; San Francisco, CA, USA; 8 pages.

Office Action for Japanese Application 2017-567461, dated Dec. 10, 2018, 3 pages.

Office Action for Korean Application 10-2018-7003396, dated Dec. 14, 2018, 7 pages.

* cited by examiner

SPLIT BEARER ENHANCEMENT FOR MULTI-CONNECTIVITY

CROSS-REFERENCE TO RELATED APPLICATIONS

This application is a national stage entry of PCT Application No. PCT/EP2016/064168 filed Jun. 20, 2016, entitled "SPLIT BEARER ENHANCEMENT FOR MULTI-CONNECTIVITY," which claims priority to Indian patent application 2019/DEL/2015, filed Jul. 3, 2015, both of which are hereby incorporated by reference in their entirety.

FIELD

The present application relates to a method, apparatus, system and computer program and in particular but not exclusively to multi-connectivity.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). The wireless systems can typically be divided into cells, and are therefore often referred to as cellular systems. A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the 3rd Generation Partnership Project (3GPP). The various development stages of the 3GPP LTE specifications are referred to as releases. Certain releases of 3GPP LTE (e.g., LTE Rel-11, LTE Rel-12, LTE Rel-13) are targeted towards LTE-Advanced (LTE-A). LTE-A is directed towards extending and optimising the 3GPP LTE radio access technologies. A goal of LTE-A is to provide significantly enhanced services by means of higher data rates and lower latency with reduced cost.

SUMMARY

In a first aspect there is provided a method comprising communicating, at a first network access point, with a core network entity using a user plane protocol, said communicating comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer.

The first network access point may be a secondary eNB. The second network access point may be a master eNB.

The first network access point may be a small cell access point. The second network access point may be a macro cell access point.

The first network access point may be associated with a first network and the second network access point may be associated with a second network.

The first network access point and the second network access point may be associated with a first network.

The user plane protocol may be an S1-U protocol.

The control plane protocol may be a S1-MME protocol.

The first bearer may be split over an X2 interface.

The method may comprise receiving a request from the second network access point to establish the first bearer split at the first network access point, said request comprising data transmission information or a split portion rate.

The method may comprise causing data transmission information or a split portion rate to be sent to the second network access point in response to the request.

The method may comprise causing a request to be sent to the second network access point to receive data on the first bearer, said request comprising data transmission information or a split portion rate.

In a second aspect there is provided a method comprising receiving user data on a first bearer from a first network access point at a second network access point, the first bearer being split at the first network access point, the first network access point and the second network access point configured to communicate wirelessly with a plurality of user equipments and communicating, at the second network access point with a core network entity, using a control plane protocol.

The first network access point may be a secondary eNB. The second network access point may be a master eNB.

The first network access point may be a small cell access point. The second network access point may be a macro cell access point.

The first network access point may be associated with a first network and the second network access point is associated with a second network.

The first network access point and the second network access point may be associated with a first network.

The user plane protocol may be an S1-U protocol.

The control plane protocol may be a S1-MME protocol.

The first bearer may be split over an X2 interface.

The method may comprise causing a request to be sent to the first network access point to establish the first bearer split at the first network access point, said request comprising data transmission information or a split portion rate.

The method may comprise receiving data transmission information or a split portion rate from the first network access point in response to the request.

The method may comprise receiving a request from the first network access point to receive data on the first bearer, said request comprising data transmission information or a split portion rate.

In a third aspect there is provided an apparatus, said apparatus comprising means for communicating, at a first network access point, with a core network entity using a user plane protocol, said means for communicating comprising means for receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer.

The first network access point may be a secondary eNB. The second network access point may be a master eNB.

The first network access point may be a small cell access point. The second network access point may be a macro cell access point.

The first network access point may be associated with a first network and the second network access point may be associated with a second network.

The first network access point and the second network access point may be associated with a first network.

The user plane protocol may be an S1-U protocol.

The control plane protocol may be a S1-MME protocol.

The first bearer may be split over an X2 interface.

The apparatus may comprise means for receiving a request from the second network access point to establish the first bearer split at the first network access point, said request comprising data transmission information or a split portion rate.

The apparatus may comprise means for causing data transmission information or a split portion rate to be sent to the second network access point in response to the request.

The apparatus may comprise means for causing a request to be sent to the second network access point to receive data on the first bearer, said request comprising data transmission information or a split portion rate.

In a fourth aspect there is provided means for receiving user data on a first bearer from a first network access point at a second network access point, the first bearer being split at the first network access point, the first network access point and the second network access point configured to communicate wirelessly with a plurality of user equipments and means for communicating, at the second network access point with a core network entity, using a control plane protocol.

The first network access point may be a secondary eNB. The second network access point may be a master eNB.

The first network access point may be a small cell access point. The second network access point may be a macro cell access point.

The first network access point may be associated with a first network and the second network access point is associated with a second network.

The first network access point and the second network access point may be associated with a first network.

The user plane protocol may be an S1-U protocol.

The control plane protocol may be a S1-MME protocol.

The first bearer may be split over an X2 interface.

The apparatus may comprise means for causing a request to be sent to the first network access point to establish the first bearer split at the first network access point, said request comprising data transmission information or a split portion rate.

The apparatus may comprise means for receiving data transmission information or a split portion rate from the first network access point in response to the request.

The apparatus may comprise means for receiving a request from the first network access point to receive data on the first bearer, said request comprising data transmission information or a split portion rate.

In a fifth aspect there is provided an apparatus at least one processor and at least one memory including a computer program code, the at least one memory and the computer program code configured to, with the at least one processor, cause the apparatus at least to communicate, at a first network access point, with a core network entity using a user plane protocol, said communication comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer.

The first network access point may be a secondary eNB. The second network access point may be a master eNB.

The first network access point may be a small cell access point. The second network access point may be a macro cell access point.

The first network access point may be associated with a first network and the second network access point may be associated with a second network.

The first network access point and the second network access point may be associated with a first network.

The user plane protocol may be an S1-U protocol.

The control plane protocol may be a S1-MME protocol.

The first bearer may be split over an X2 interface.

The apparatus may be configured to receive a request from the second network access point to establish the first bearer split at the first network access point, said request comprising data transmission information or a split portion rate.

The apparatus may be configured to cause data transmission information or a split portion rate to be sent to the second network access point in response to the request.

The apparatus may be configured to cause a request to be sent to the second network access point to receive data on the first bearer, said request comprising data transmission information or a split portion rate.

In a sixth aspect there is provided an apparatus at least one processor and at least one memory including a computer program code, the at least one memory and the computer program code configured to, with the at least one processor, cause the apparatus at least to receive user data on a first bearer from a first network access point at a second network access point, the first bearer being split at the first network access point, the first network access point and the second network access point configured to communicate wirelessly with a plurality of user equipments and communicate, at the second network access point, with a core network entity using a control plane protocol.

The first network access point may be a secondary eNB. The second network access point may be a master eNB.

The first network access point may be a small cell access point. The second network access point may be a macro cell access point.

The first network access point may be associated with a first network and the second network access point is associated with a second network.

The first network access point and the second network access point may be associated with a first network.

The user plane protocol may be an S1-U protocol.

The control plane protocol may be a S1-MME protocol.

The first bearer may be split over an X2 interface.

The apparatus may be configured to cause a request to be sent to the first network access point to establish the first bearer split at the first network access point, said request comprising data transmission information or a split portion rate.

The apparatus may be configured to receive data transmission information or a split portion rate from the first network access point in response to the request.

The apparatus may be configured to receive a request from the first network access point to receive data on the first bearer, said request comprising data transmission information or a split portion rate.

In a seventh aspect there is provided a computer program embodied on a non-transitory computer-readable storage medium, the computer program comprising program code for controlling a process to execute a process, the process comprising communicating, at a first network access point, with a core network entity using a user plane protocol, said communicating comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer.

The first network access point may be a secondary eNB. The second network access point may be a master eNB.

The first network access point may be a small cell access point. The second network access point may be a macro cell access point.

The first network access point may be associated with a first network and the second network access point may be associated with a second network.

The first network access point and the second network access point may be associated with a first network.

The user plane protocol may be an S1-U protocol.

The control plane protocol may be a S1-MME protocol.

The first bearer may be split over an X2 interface.

The process may comprise receiving a request from the second network access point to establish the first bearer split at the first network access point, said request comprising data transmission information or a split portion rate.

The process may comprise causing data transmission information or a split portion rate to be sent to the second network access point in response to the request.

The process may comprise causing a request to be sent to the second network access point to receive data on the first bearer, said request comprising data transmission information or a split portion rate.

In an eighth aspect there is provided a computer program embodied on a non-transitory computer-readable storage medium, the computer program comprising program code for controlling a process to execute a process, the process comprising receiving user data on a first bearer from a first network access point at a second network access point, the first bearer being split at the first network access point, the first network access point and the second network access point configured to communicate wirelessly with a plurality of user equipments and communicating, at the second network access point, with a core network entity using a control plane protocol.

The first network access point may be a secondary eNB. The second network access point may be a master eNB.

The first network access point may be a small cell access point. The second network access point may be a macro cell access point.

The first network access point may be associated with a first network and the second network access point is associated with a second network.

The first network access point and the second network access point may be associated with a first network.

The user plane protocol may be an S1-U protocol.

The control plane protocol may be a S1-MME protocol.

The first bearer may be split over an X2 interface.

The process may comprise causing a request to be sent to the first network access point to establish the first bearer split at the first network access point, said request comprising data transmission information or a split portion rate.

The process may comprise receiving data transmission information or a split portion rate from the first network access point in response to the request.

The process may comprise receiving a request from the first network access point to receive data on the first bearer, said request comprising data transmission information or a split portion rate.

In a ninth aspect there is provided a computer program product for a computer, comprising software code portions for performing the steps the method of the first aspect when said product is run on the computer.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 2 to assist in understanding the technology underlying the described examples.

Figure 1:
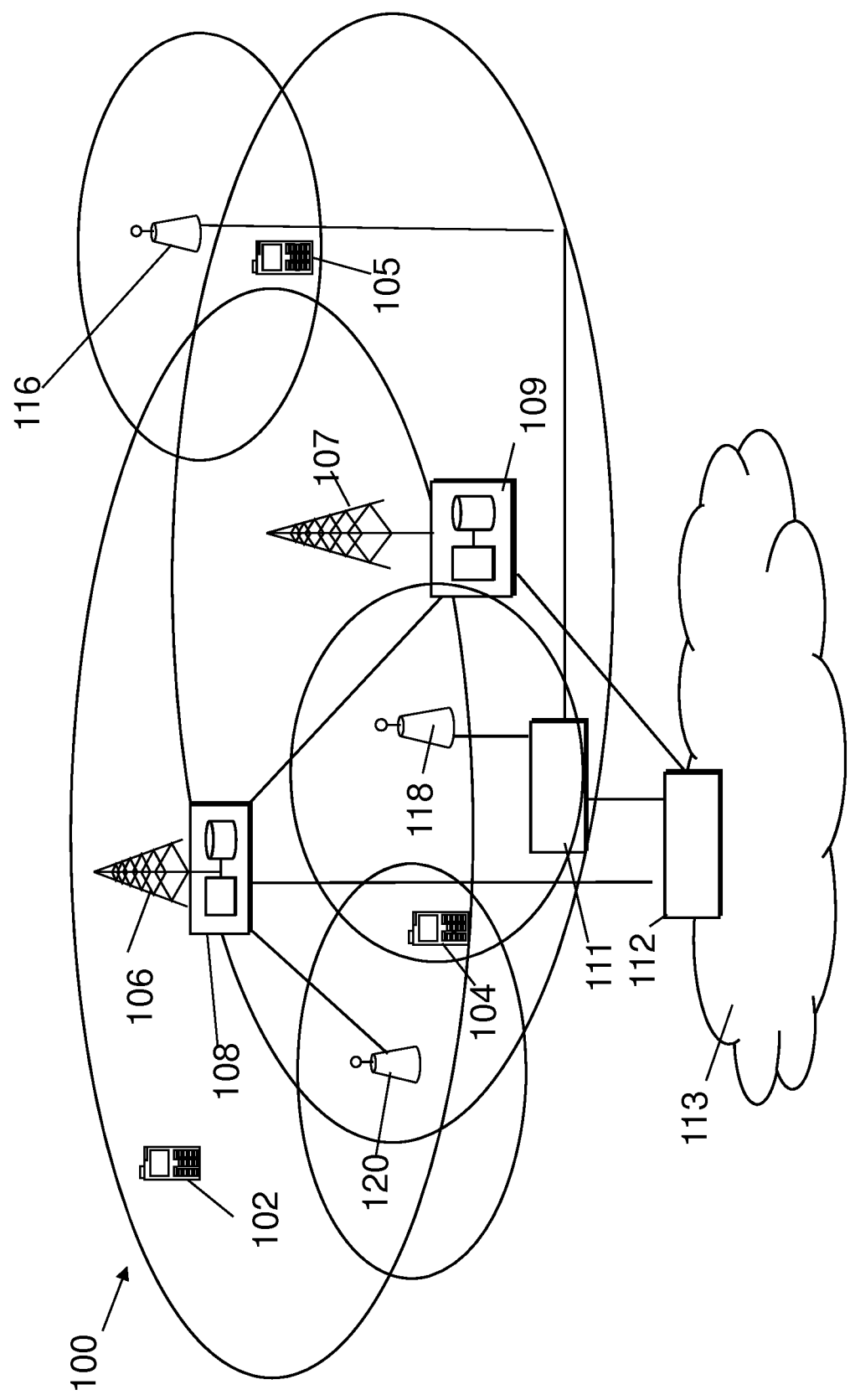
FIG. 1 shows a schematic diagram of an example communication system comprising a base station and a plurality of communication devices.

In a wireless communication system 100, such as that shown in FIG. 1, mobile communication devices or user equipment (UE) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

LTE systems may however be considered to have a so-called "flat" architecture, without the provision of RNCs; rather the (e)NB is in communication with a system architecture evolution gateway (SAE-GW) and a mobility management entity (MME), which entities may also be pooled meaning that a plurality of these nodes may serve a plurality (set) of (e)NBs. Each UE is served by only one MME and/or S-GW at a time and the (e)NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. Smaller base stations 116, 118 and 120 may be part of a second network, for example WLAN and may be WLAN APs.

Figure 2:
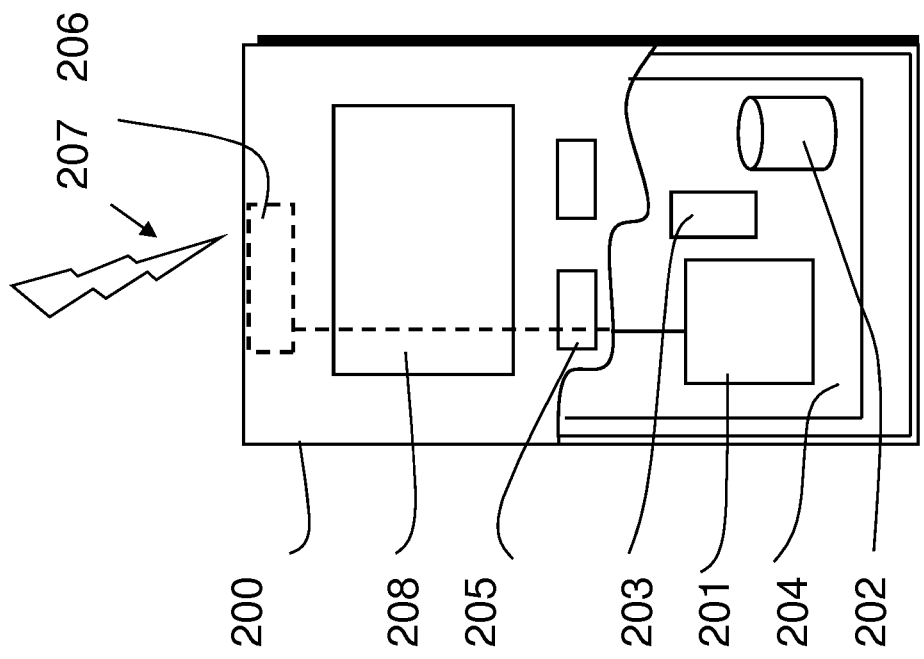
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area. Another example of a suitable communications system is the 5G concept. Network architecture in 5G may be quite similar to that of the LTE-advanced. Changes to the network architecture may depend on the need to support various radio technologies and finer QoS support, and some on-demand requirements for e.g. QoS levels to support QoE of user point of view. Also network aware services and applications, and service and application aware networks may bring changes to the architecture. Those are related to Information Centric Network (ICN) and User-Centric Content Delivery Network (UC-CDN) approaches. 5G may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent The following relates to dual connectivity (DC). Dual connectivity is a mode of operation of a UE in connected, e.g. RRC_CONNECTED, mode. The UE is configured with a master cell group (MCG) and a secondary cell group (SCG). Dual connectivity may achieve improved inter-site carrier aggregation performance across cells connected via non-ideal-backhaul.

Figure 3:
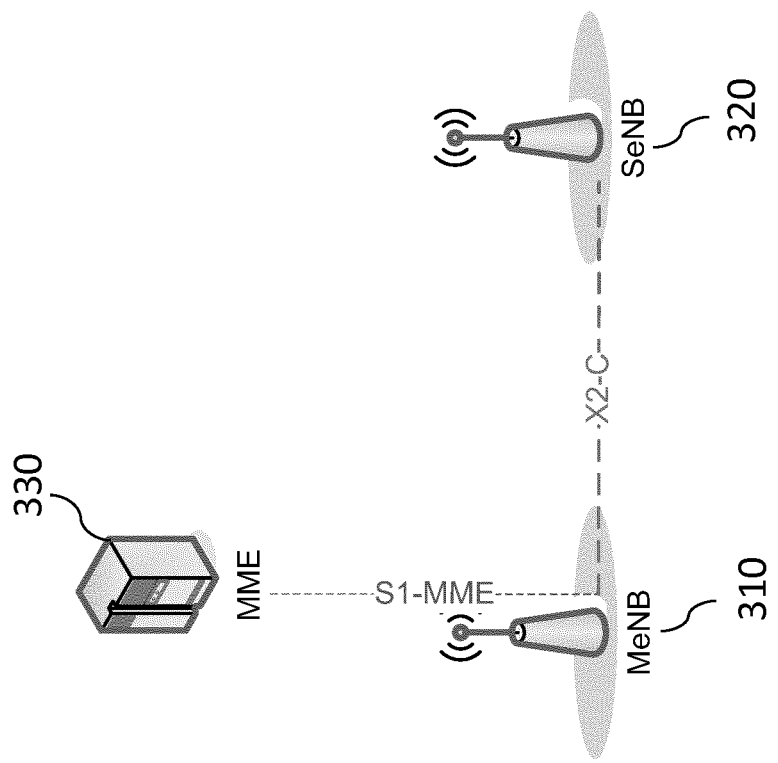
FIG. 3 shows a schematic diagram of a control plane architecture for eNBs involved in dual connectivity.

FIG. 3 shows a schematic diagram of an example control plane (C-Plane) architecture of eNBs 310 and 320 involved in dual connectivity. The interface between the MeNB 310 and the MME 330 is S1-MME. The interface between the MeNB 310 and the SeNB 320 is X2-C.

Figure 4:
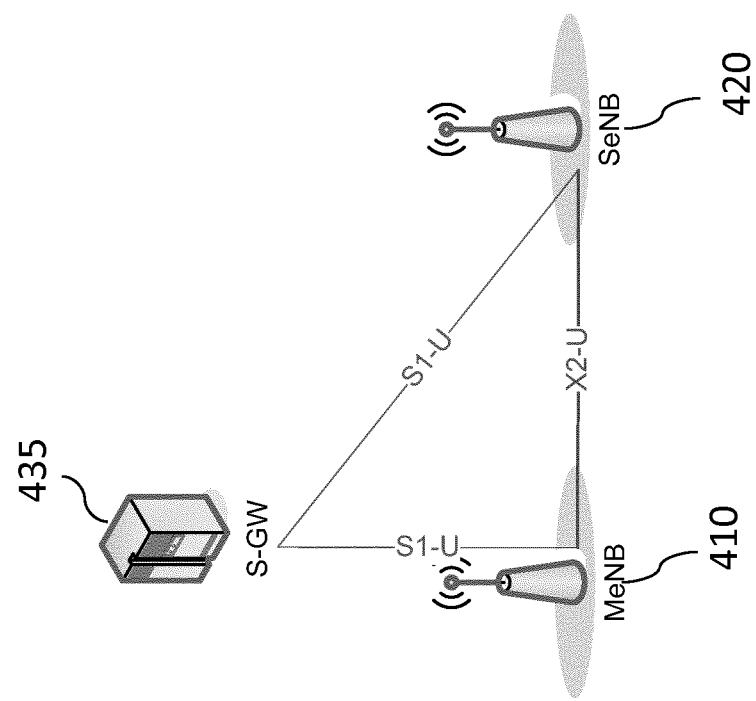
FIG. 4 shows a schematic diagram of a user plane architecture for eNBs involved in dual connectivity.

FIG. 4 shows a schematic diagram of an example U-plane architecture of eNBs 410 and 420 involved in dual connectivity with MCG bearers and SCG bearers. The interface between the MeNB 410 and the S-GW 430, and between the SeNB 420 and the S-GW 430 is S1-U. The interface between the MeNB 410 and the SeNB 420 is X2-U.

In dual connectivity, three types of bearers may be used. MCG bearers, split bearers and SCG bearers. For MCG bearers, the master eNB (MeNB) is user plane (U-plane) connected to the S-GW via S1-U, the secondary eNB (SeNB) is not involved in the transport of user plane data. For split bearers, the MeNB is U-plane connected to the S-GW via S1-U and the MeNB and the SeNB are interconnected via X2-U. For SCG bearers, the SeNB is directly connected with the S-GW via S1-U.

In a so-called "alternative 3C" solution in dual connectivity (a.k.a. split bearer), data from the same radio bearer can be transmitted from both nodes involved in dual connectivity, typically a macro eNB and a small cell eNB. The S1-U, S1-MME and the RRC protocols are terminated at the same node, which is called the master eNB (MeNB). The MeNB can either be a macro cell or a small cell, though it may be preferable that a macro cell operates as the MeNB to avoid exposing small cell mobility to the core network (since the S1-MME is also terminated in the MeNB).

In a dual connectivity solution such as that described above, a single eNB (the MeNB) is designated as the network node that terminates the RRC protocol towards the UE, as well as the S1-U and S1-MME connections from the core network. The MeNB may be a macro cell or a small cell. Terminating S1-MME and RRC at the macro eNB may provide improved coverage and mobility robustness. In this example dual connectivity architecture, S1-U is terminated at the same node that terminates the S1-MME and RRC protocols. With S1-U termination at the macro cell, there is an increase in processing overhead (PDCP, flow control, S1-U termination, etc.) at the macro eNB for all the small cells under its coverage area. The macro eNB may become a transport bottleneck because the macro eNB processes the user-plane data of itself and all the small cells under the coverage area of the macro eNB. In addition, there is an additional hop for bearer data packets coming from the core network via the macro cell to the small cell.

Figure 5:
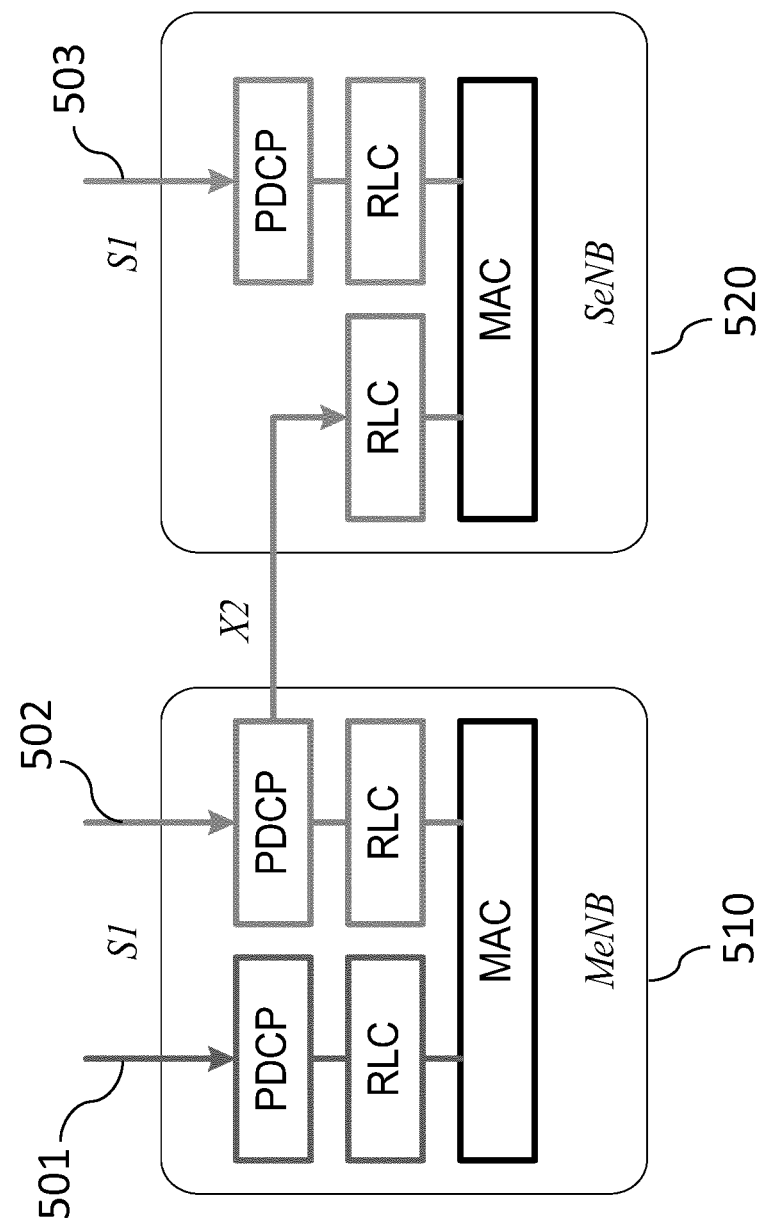
FIG. 5 shows a schematic diagram of user plane architecture for three bearer alternatives in dual connectivity.

FIG. 5 shows example user plane protocol architecture for a legacy bearer (MCG bearer) 501, a split bearer 502 and an offloaded bearer (SCG bearer) 503.

As can be seen in FIG. 5, the S1-U termination for a split bearer 502 is at the macro cell (MeNB 510), while part of the user-plane data is forwarded over X2 to the small cell (SeNB 520). This may increase backhaul and macro eNB processing requirements due to S1-U always being terminated at the MeNB 510, meaning that all user-plane data needs to traverse the MeNB 510. If the UE gets most of its throughput from the small cell, there may be an increased backhaul capacity requirement and/or a decrease in throughput performance if data is not available at the small cells when resources are available there—due to e.g. non ideal flow control.

A small cell may be configured as MeNB so that S1-U termination for a split bearer is at the SeNB. However, this solution exposes small cell mobility to the core network which may not be desirable.

Figure 6A:
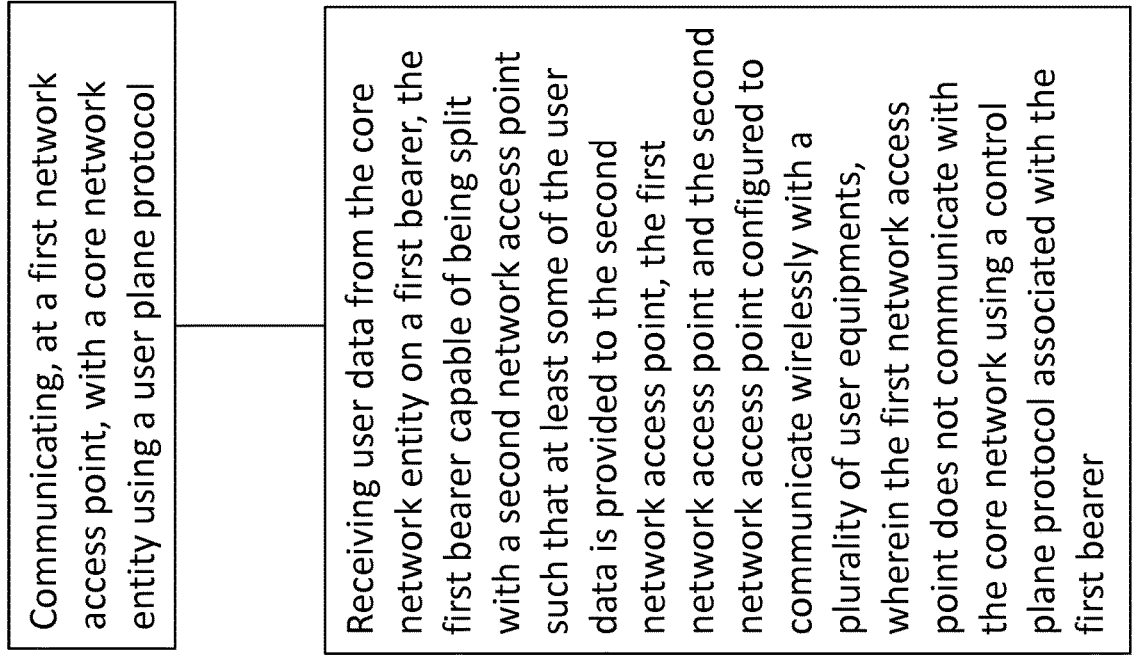
FIG. 6*a* shows a flowchart of an example method of using dual connectivity architecture.

FIG. 6a shows a flowchart of a method using an example user-plane protocol architecture.

The method comprises communicating, at a first network access point, with a core network entity using a user plane protocol, said communicating comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer.

Figure 6B:
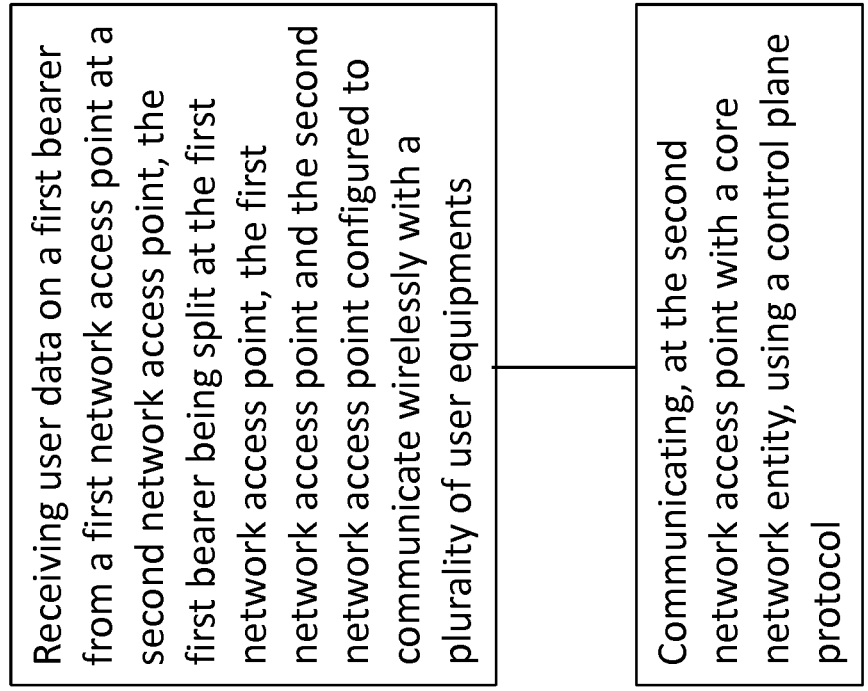
FIG. 6b shows a flowchart of an example method of using dual connectivity architecture.

FIG. 6*b* shows a flowchart of a method using an example user-plane protocol architecture. The method comprises receiving user data on a first bearer from a first network access point at a second network access point, the first bearer being split at the first network access point, the first network access point and the second network access point configured to communicate wirelessly with a plurality of user equipments and communicating, at the second network access point with a core network entity, using a control plane protocol.

The user plane protocol architecture may provide similar performance to the "alternative 3C" solution of dual connectivity while reducing the impact on the transport and processing requirements in the macro eNB.

The first network access point may be a secondary base station, SeNB or 5G AP. The second network access point may be a MeNB. The first network access point may be a small cell access point and the second network access point may be a macro access point. However, the method is not limited to these examples and the network access points may be any suitable access points for a wireless network. The user plane protocol may comprise a S1-U interface with the S-GW of a core network. The control plane protocol may comprise an S1-AP interface, e.g. S1-MME interface with the MME of the core network.

The data may be transmitted to the second network access point over an X2 interface.

The second network access point may terminate the control plane protocol towards the user equipments.

The first and second network access points may be associated with a first network. Alternatively, the first and second network access points may be associated with first and second networks respectively. For example, the first network access point may be associated with a 5G network and the second network access point with an LTE/LTE-A network.

The method may provide termination of an S1-U connection of a bearer from a core network at the SeNB (e.g. small cell). A split radio bearer may still be used, i.e., some of the U-plane data may be transmitted to the UE via the MeNB (e.g. macro cell) after being forwarded from the SeNB to the MeNB over X2. The RRC and S1-MME are terminated at the MeNB.

Figure 7:
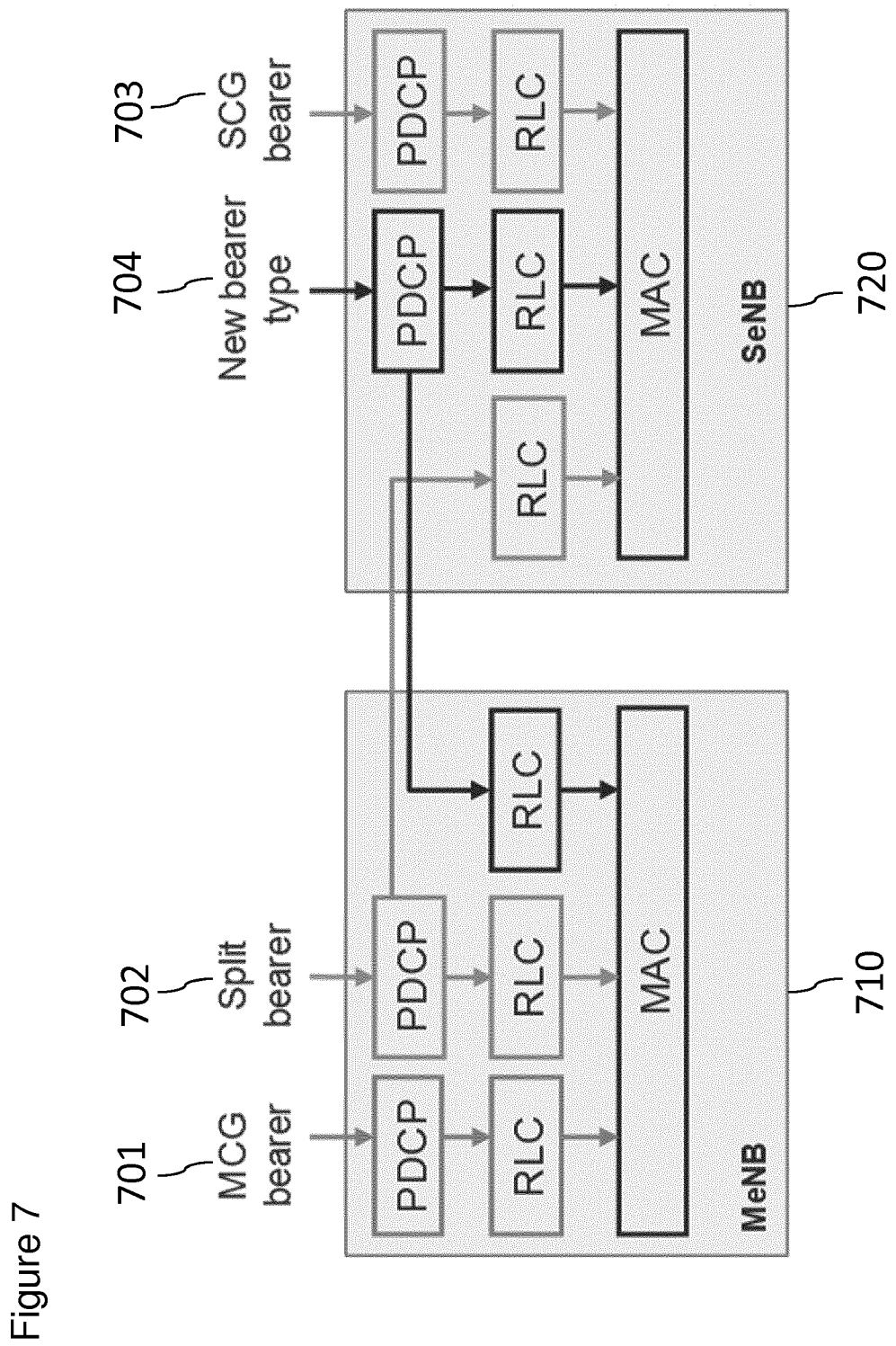
FIG. 7 shows a schematic diagram of user plane protocol architecture for an example bearer type.

FIG. 7 shows an example user-plane protocol architecture corresponding to a method such as that of FIG. 6. Split radio bearer 704 is shown, alongside MCG bearer 701, Split bearer 702 and SCG bearer 703.

In an embodiment, the proposed protocol architecture is implemented as a new bearer type 704. eNB 1 communicates with S-GW 835 using S1-U. S1-U for the new bearer type is terminated in the SeNB 720 while RRC and S1-MME with MME 830 are both terminated in the MeNB 710. MeNB 710 may control maintaining the RRC connection, configuring and managing the RRM measurements, etc. However, since PDCP is terminated in the SeNB 720, the new bearer type requires separate security keys at the MeNB 710 and at the SeNB 720 as for SCG bearers.

Figure 8:
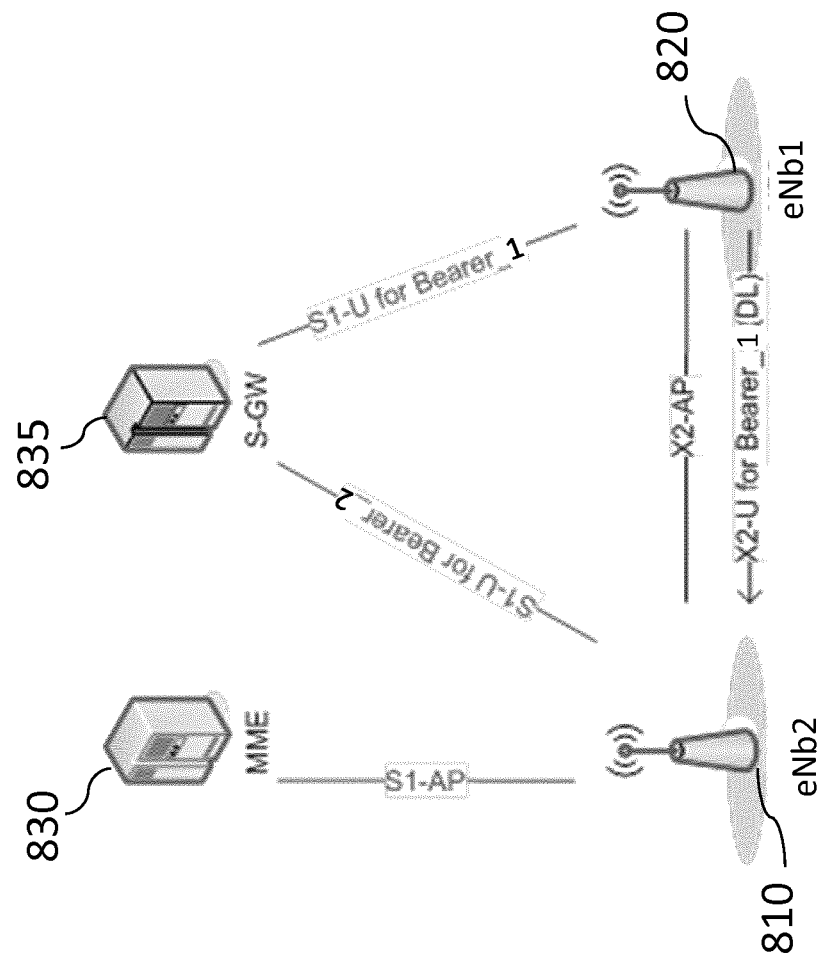
FIG. 8 shows a schematic diagram of an example dual connectivity protocol architecture.

FIG. 8 shows an example architecture for dual connectivity. RRC is terminated at eNB2 810, S1-AP (application protocol) is located at eNB 2 810. Data is forwarded to eNB2 810 from eNB1 820 using X2-U for bearer_1. The data for the bearer can be transmitted over carriers served by both eNB1 820 and eNB 2 810. Downlink flow control information may be provided to eNB1 820 from eNB2 810 over the X2 interface. A UE involved in dual connectivity may have a user plane connection with and be able to receive data from, both eNB1 820 and eNB2 810.

PDCP for bearer_1 is terminated at eNB1 820 (which may be, e.g. a 5G AP). Bearer 1 is a split bearer such that data can be forwarded to eNB2 810. Data may be forwarded to eNB2 810 from eNB1 820 using information received from eNB2 810 in X2-AP. Flow control information may be provided to eNB2 810 from eNB1 820 over X2.

If a second network access point, e.g. MeNB such as eNB2 810 decides to establish E-RAB (E-UTRAN radio access bearer) using SeNB split bearer, or if MeNB decides to modify already established E-RAB to SeNB split bearer, eNB2 810 may initiate SeNB Addition procedure or SeNB Modification procedure including an indication information, e.g., data transmission information, split portion rate, etc.

If a first access point, e.g. SeNB such as eNB1 820 decides to modify already established E-RAB to SeNB split bearer, eNB1 may initiate SeNB Modification Required procedure including an indication information e.g., split portion rate change, etc.

If eNB1 or eNB2 decides to modify SeNB split bearer to other bearer type (e.g. MCG bearer), it may initiate SeNB Modification procedure, or SeNB Release procedure.

In an embodiment (which may be suitable for 5G deployments), the RRC protocol (or corresponding protocol) may also be terminated in the SeNB (i.e. in the node where S1-U is terminated).

The processing load and/or macro transport requirements may be reduced by offloading the user-plane bearer termination to the SeNB while still maintaining the possibility of transmitting data of the same radio bearer via both nodes involved in dual connectivity operation (with associated radio aggregation gains).

X2 backhauling benefits may be provided by avoiding the need to transport large volumes of data over X2 by terminating S1-U in the node that gives larger throughput to the UE. For example, if the UE gets 80% of its throughput from the small cell, and 20% of its throughput from the macro, then the carried traffic over X2 is only 20%. For comparison, in the legacy approach, X2 would have to carry 80% of the traffic.

Improved over-the-air throughput performance for UEs by minimizing the impact of non-ideal flow control (in case larger amount of data is transmitted via SeNB) may be achieved.

As the UE is still RRC connected to the macro cell and S1-MME is also terminated at the macro cell, the mobility robustness gains of dual connectivity may be maintained. The core network may be at least partially exposed to small cell mobility.

The proposed bearer configuration may be of particular use for UEs who obtain a larger throughput from the small cells since it may be advantageous for the data traffic to be terminated at that node from which the UE gets most of its throughput. An additional condition could be imposed to use this bearer configuration mainly for low mobility UEs.

It should be understood that each block of the flowchart of FIGS. 6a and 6b and any combination thereof may be implemented by various means or their combinations, such as hardware, software, firmware, one or more processors and/or circuitry.

Figure 9:
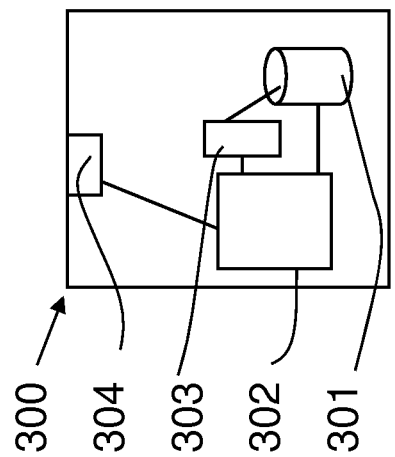
FIG. 9 shows a schematic diagram of an example control apparatus.

The method may be implemented on a mobile device as described with respect to FIG. 2 or control apparatus as shown in FIG. 9. FIG. 9 shows an example of a control apparatus for a communication system, for example to be coupled to and/or for controlling a station of an access system, such as a RAN node, e.g. a base station, (e) node B or 5G AP, or a node of a core network such as an MME or S-GW, or a server or host. The method may be implanted in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. Control functions may comprise communicating, at a first network access point, with a core network entity using a user plane protocol, said communicating comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer.

Alternatively, or in addition, control functions may comprise receiving user data on a first bearer from a first network access point at a second network access point, the first bearer being split at the first network access point, the first network access point and the second network access point configured to communicate wirelessly with a plurality of user equipments and communicating, at the second network access point with a core network entity, using a control plane protocol.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst embodiments have been described in relation to LTE/LTE-A similar principles can be applied in relation to other networks and communication systems, for example, 5G networks. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
   communicating, at a first network access point, with a core network entity using a user plane protocol, said communicating comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer, wherein the first network access point is a secondary network access point and the second network access point is a master network access point.

2. A method according to claim 1, wherein the first network access point is a small cell access point and the second network access point is a macro cell access point.

3. A method according to claim 1, wherein at least one of the user plane protocol is an S1-U protocol, the control plane protocol is a S1-MME protocol, and the first bearer is split over an X2 interface.

4. A method according to claim 1 comprising:
   receiving a request from the second network access point to establish the first bearer split at the first network access point, comprising data transmission information or a split portion rate.

5. A method according to claim 4, comprising:
   causing data transmission information or a split portion rate to be sent to the second network access point in response to the request.

6. A method according to claim 1, comprising: causing a request to be sent to the second network access point to receive data on the first bearer, said request comprising data transmission information or a split portion rate.

7. The method of claim 1, wherein the secondary network access point is a secondary eNB and the master network access point is a master eNB.

8. A method comprising:
   receiving user data on a first bearer from a first network access point at a second network access point, the first bearer being split at the first network access point, the first network access point and the second network access point configured to communicate wirelessly with a plurality of user equipments; and
   communicating, at the second network access point with a core network entity, using a control plane protocol, wherein the first network access point is a secondary network access point and the second network access point is a master network access point.

9. A method according to claim 8, wherein the first network access point is a small cell access point and the second network access point is a macro cell access point.

10. A method according to claim 8, wherein the user plane protocol is an S1-U protocol, the control plane protocol is a S1-MME protocol, and the first bearer is split over an X2 interface.

11. A method according to claim 8, comprising:
    causing a request to be sent to the first network access point to establish the first bearer split at the first network entity, comprising data transmission information or a split portion rate.

12. A method according to claim 11, comprising:
    receiving data transmission information or a split portion rate from the first network access point in response to the request.

13. A method according to claim 8, comprising:
    receiving a request from the first network access point to receive data on the first bearer, said request comprising data transmission information or a split portion rate.

14. The method of claim 8, wherein the secondary network access point is a secondary eNB and the master network access point is a master eNB.

15. An apparatus comprising:
    at least one processor and at least one memory including a computer program code, the at least one memory and the computer program code configured to, with the at least one processor, cause the apparatus at least to:
    communicate, at a first network access point, with a core network entity using a user plane protocol, said communication comprising receiving user data from the core network entity on a first bearer, the first bearer capable of being split with a second network access point such that at least some of the user data is provided to the second network access point, the first network access point and the second network access point configured to communicate wirelessly with a plurality of user equipments, and wherein the first network access point does not communicate with the core network using a control plane protocol associated with the first bearer, wherein the first network access point is a secondary network access point and the second network access point is a master network access point.

16. The apparatus of claim 15, wherein the secondary network access point is a secondary eNB and the master network access point is a master eNB.

17. An apparatus comprising:
    at least one processor and at least one memory including a computer program code, the at least one memory and the computer program code configured to, with the at least one processor, cause the apparatus at least to:
    receive user data on a first bearer from a first network access point at a second network access point, the first bearer being split at the first network access point, the first network access point and the second network access point configured to communicate wirelessly with a plurality of user equipments; and
    communicate, at the second network access point, with a core network entity using a control plane protocol, wherein the first network access point is a secondary network access point and the second network access point is a master network access point.

18. The apparatus claim 17, wherein the secondary network access point is a secondary eNB and the master network access point is a master eNB.

* * * * *